US012564132B2

(12) United States Patent
Vadnere et al.

(10) Patent No.: US 12,564,132 B2
(45) Date of Patent: Mar. 3, 2026

(54) HARVESTER IMPLEMENT WITH AUTOMATED OPERATING MODE INITIALIZATION

(71) Applicant: DEERE & COMPANY, Moline, IL (US)

(72) Inventors: Mohan A. Vadnere, Pune (IN); Umesh B. Jadhao, Pune (IN)

(73) Assignee: DEERE & COMPANY, Moline, IL (US)

( * ) Notice: Subject to any disclaimer, the term of this patent is extended or adjusted under 35 U.S.C. 154(b) by 601 days.

(21) Appl. No.: 18/154,252

(22) Filed: Jan. 13, 2023

(65) Prior Publication Data

US 2024/0237579 A1 Jul. 18, 2024

(51) Int. Cl.
| | | |
|---|---|---|
| *A01D 41/00* | (2006.01) | |
| *A01D 41/127* | (2006.01) | |
| *A01D 41/14* | (2006.01) | |

(52) U.S. Cl.
CPC ......... *A01D 41/141* (2013.01); *A01D 41/127* (2013.01)

(58) Field of Classification Search
CPC ...... A01D 41/141; A01D 41/127; B60Q 1/08; B60Q 1/50; B60Q 2800/20; B60Q 1/24
See application file for complete search history.

(56) References Cited

U.S. PATENT DOCUMENTS

| | | | | |
|---|---|---|---|---|
| 5,867,970 | A * | 2/1999 | Ehrhart | .................. A01D 34/66 |
| 9,527,493 | B2 * | 12/2016 | Von Mezynski | ...... B60W 10/00 |

| | | | | |
|---|---|---|---|---|
| 10,834,798 | B1 | 11/2020 | Hunt et al. | |
| 2009/0069964 | A1 | 3/2009 | Wyatt et al. | |
| 2014/0157746 | A1 * | 6/2014 | Dilts | .................... A01D 41/145 |
| 2014/0295922 | A1 * | 10/2014 | Buermann | ............. A01D 41/02 |
| 2016/0243982 | A1 * | 8/2016 | Ruffner | .................. B60Q 1/50 |
| 2018/0050724 | A1 | 2/2018 | Morselli et al. | |
| 2020/0323133 | A1 * | 10/2020 | Anderson | ............ A01B 79/005 |
| 2020/0337241 | A1 * | 10/2020 | Brimeyer | ............. A01D 41/145 |
| 2021/0120743 | A1 * | 4/2021 | Trowbridge | ......... A01D 61/002 |
| 2021/0185917 | A1 | 6/2021 | Hunt et al. | |

(Continued)

FOREIGN PATENT DOCUMENTS

| | | | | |
|---|---|---|---|---|
| WO | WO2018055442 | A1 * | 3/2018 | ............. A01D 41/12 |
| WO | WO2019036674 | A1 * | 2/2019 | ............... B60Q 1/08 |

OTHER PUBLICATIONS

Extended European Search Report and Written Opinion issued in European Patent Application No. 23215715.6 dated Jun. 5, 2024, in 14 pages.

*Primary Examiner* — Russell Frejd
*Assistant Examiner* — Brittany Renee Peko

(57) ABSTRACT

A harvester implement includes a vehicle controller including an initialization algorithm operable to receive a command input. The command input selects one of a plurality of machine initialization modes. Each of the machine initialization modes has a pre-defined setting for at least one of a power source, a harvester header, and a vehicle light arrangement for implementing one of a plurality of operating modes associated therewith. The vehicle controller may then automatically control one of the power control system, the header control system, and the light control system to establish the pre-defined setting therefor in the power source, the harvester header, and the vehicle light arrangement respectively to prepare the harvester implement for the operating mode associated with the selected machine initialization mode.

15 Claims, 5 Drawing Sheets

(56) References Cited

U.S. PATENT DOCUMENTS

| 2022/0142034 A1 | 5/2022 | Kraus | |
| 2022/0167543 A1 | 6/2022 | Bast et al. | |
| 2022/0210975 A1* | 7/2022 | Digman | A01D 43/05 |
| 2023/0345878 A1* | 11/2023 | Hamilton | A01D 57/26 |

* cited by examiner

HARVESTER IMPLEMENT WITH AUTOMATED OPERATING MODE INITIALIZATION

TECHNICAL FIELD

The disclosure generally relates to a harvester implement having an automated initialization algorithm for automatically setting operating parameters of the harvester implement for a desired operating mode.

BACKGROUND

Harvester implements often operate in different operating modes at various times. For example, a harvester implement may be configured to operate in an on road operating mode when traveling on a roadway from one harvest location to another. Upon arriving at a harvest location, the harvest implement may be configured to operate in a field harvest operating mode to harvest crop. The harvester implement may be configured to operate in other operating modes, which may include but are not limited to, operations in a field while not harvesting such as executing a headland turn, performing service and/or maintenance on the harvester implement, attaching a header attachment to the harvester implement etc.

Each of these different operating modes requires that several different operating parameters of the harvester implement be configured in a certain manner and/or in a certain sequence to prepare the harvester implement for the desired operating mode.

SUMMARY

A harvester implement is provided. The harvester implement includes a power source having a power control system operable to control operation of the power source, a harvester header having a header control system operable to control operation of the harvester header, and a vehicle light arrangement having a light control system operable to control operation of the vehicle light arrangement. The harvester implement further includes a vehicle controller including a processor and a memory having an initialization algorithm stored thereon. The processor is operable execute the initialization algorithm to receive a command input. The command input selects one of a plurality of machine initialization modes. Each of the plurality of machine initialization modes has a pre-defined setting for at least one of the power source, the harvester header, and the vehicle light arrangement for implementing one of a plurality of operating modes associated therewith. The vehicle controller may then automatically control at least one of the power control system, the header control system, and the light control system to establish the pre-defined setting therefor in one of the power source, the harvester header, and the vehicle light arrangement respectively. The pre-defined setting is defined by the selected one of the plurality of machine initialization modes to prepare the harvester implement for the one of the plurality of operating mode associated with the selected one of the plurality of machine initialization modes.

In one example implementation of the disclosure, the harvester implement is a self-propelled windrower. However, it should be appreciated that the harvester implement may be configured differently, such as but not limited to a combine harvester, a baler implement, a mower implement, etc.

In one aspect of the disclosure, the harvester implement may include a user interface disposed in communication with the vehicle controller. The user interface may include, but is not limited to, a touchscreen display, a microphone, a button, a control stick, etc. The processor is operable execute the initialization algorithm to receive the command input from an operator via the user interface. As such, the operator enters the command input into the vehicle controller via the user interface.

In another aspect of the disclosure, the processor may be operable to execute the initialization algorithm to receive the command input from a location algorithm. The location algorithm may be stored on the memory of the vehicle controller, with the processor operable to execute the location algorithm. In other implementations, the location algorithm may be located and executed remotely from the vehicle controller. The location algorithm determines a current location of the harvester implement, selects a desired one of the plurality of operating modes based on the current location of the harvester implement, and generates the command input commanding the one of the plurality of machine initialization modes associated with the desired one of the plurality of operating modes. As such, the location algorithm may automatically generate the command input based on the current location of the harvester implement. For example, if the location algorithm determines that the harvester implement is nearing a roadway, the location algorithm may select the on roadway initialization mode to prepare the harvester implement for operations on the roadway.

In one aspect of the disclosure, the vehicle light arrangement may include, but is not limited to, at least one of a field light unit for lighting operations in a field, a road light unit for lighting operations on a roadway, a beacon light unit for signaling operations, and a service light unit for vehicle service and maintenance operations. The harvester header may include, but is not limited to, at least one of a float cylinder for controlling a float pressure of the harvester header, a tilt cylinder for controlling a tilt position of the harvester header, a lift cylinder for controlling an elevation position of the harvester header, a crop processing unit for processing crop material, a forming shield for controlling a width of a windrow formed by the harvester header, a swathboard for controlling a height of the windrow formed by the harvester header, and a header motor for controlling a speed of a harvesting element of the harvester header. Additionally, the power source may include, but is not limited to, a throttle for controlling a torque output of the power source.

In one aspect of the disclosure, the plurality of machine initialization modes may include a field ready initialization mode for preparing the harvester implement for operations in a field. The field ready initialization mode may implement a pre-defined setting to engage the field light unit, control the float cylinder to provide a desired float pressure, control the tilt cylinder to provide a desired tilt angle of the harvester header, control the crop processing unit to exhibit a desired roll gap between a first processor roll and a second processor roll, control the forming shield to a desired position, control the swathboard to a desired position, control the throttle to a desired position to achieve an optimum torque from the power source, control the header motor to achieve and optimum speed for the harvesting element, unlock the header harvester, and control the lift cylinder to lower the header harvester to a desired elevation.

In one aspect of the disclosure, the plurality of machine initialization modes may include a road ready initialization mode for preparing the harvester implement for operations on a roadway. The road ready initialization mode may implement a pre-defined setting to disengage the field light unit, engage the road light unit, engage the beacon light unit, disengage the crop processing unit, disengage movement of the forming shield, disengage movement of the swathboard, disengage the header motor, control the lift cylinder to raise the harvester header, and lock the harvester header in the raised position.

The plurality of machine initialization modes may include a headland turn initialization mode for preparing the harvester implement headland turn during operations in the field. The headland turn initialization mode may implement a pre-defined setting to disengage the header motor, control the lift cylinder to raise the harvester header, control the lift cylinder to lower the header harvester to a desired elevation after completion of the headland turn, and re-engage the header motor.

The plurality of machine initialization modes may include a vehicle service initialization mode for preparing the harvester implement maintenance. The vehicle service initialization mode may implement a pre-defined setting to engage a park lock device, disengage the header motor, disengage the power source, disengage the crop processing unit, disengage movement of the forming shield, disengage movement of the swathboard, lock the elevation of the harvester header, and engage the service light unit.

The plurality of machine initialization modes may include a header attachment initialization mode for preparing the harvester implement attaching the harvester header. The header attachment initialization mode may implement a pre-defined setting to control the float cylinder to release float pressure, control the tilt cylinder to release tilt pressure, control the lift cylinder to lower a header mount.

Accordingly, the harvester implement described herein may automatically configure the various systems thereof for a desired operating mode based on the selected initialization mode. The initialization mode may be selected by the user or automatically generated based on the location of the harvester implement. By automating the initialization process for the different operating modes, the harvester implement described herein simplifies preparations for the desired operating mode, and reduces potential errors or omissions in preparing the harvester implement for the desired operating mode that a user may forget to or improperly execute.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate corresponding parts throughout the several views, a harvester implement 20 is generally shown at 20. The example embodiment of the harvester implement 20 is configured as a self-propelled windrower operable to mow and collect standing crop material in a field, condition the cut crop material as it moves through the harvester implement 20 to improve is drying characteristics, and then return the conditioned, cut crop material to the field in a windrow or swath. However, it should be appreciated that the teachings of this disclosure may be applied to machines other than the example implementation of the harvester implement 20 shown in the Figures and described herein.

Figure 1:
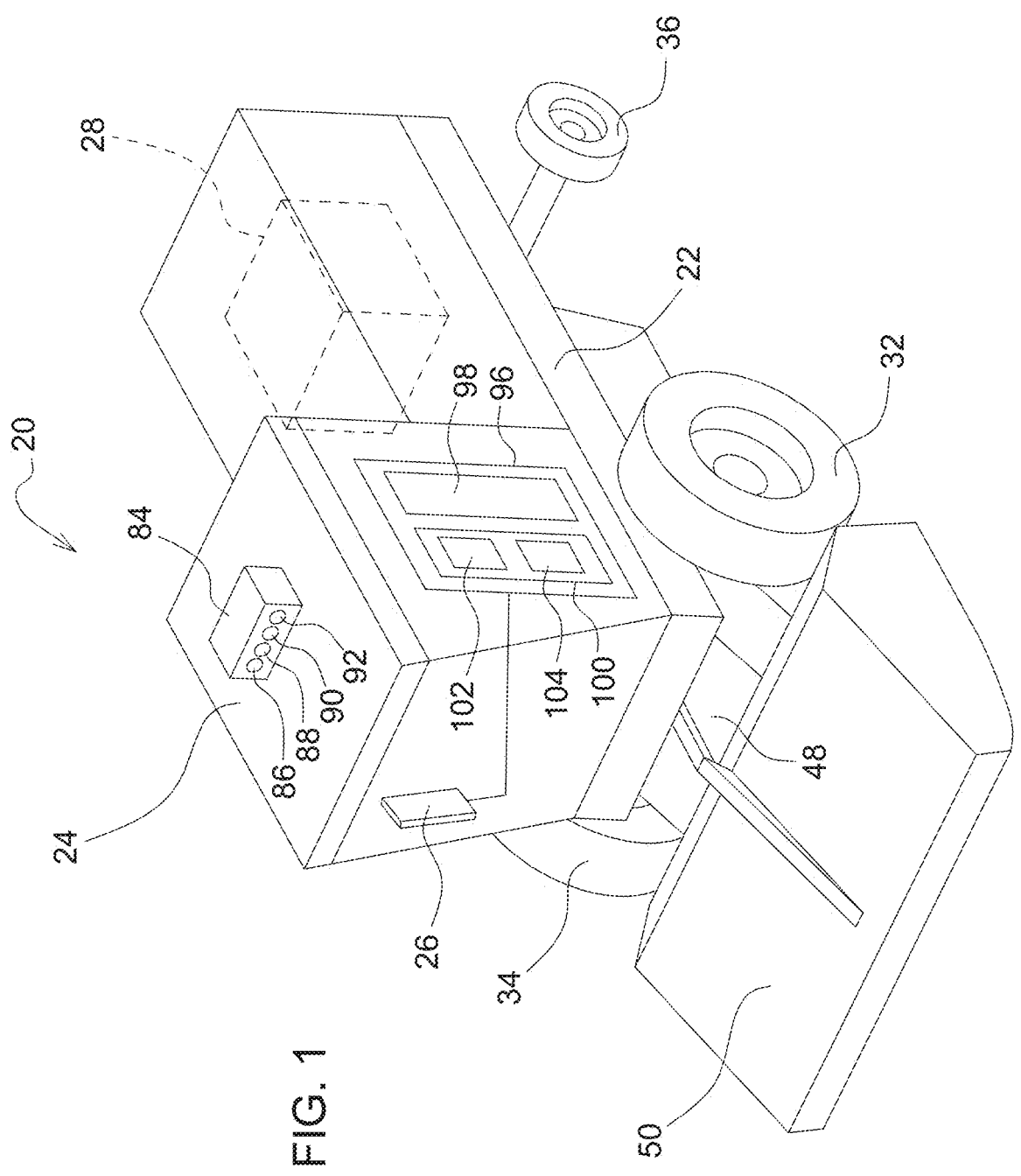
FIG. 1 is a schematic perspective view of a harvester implement.

Referring to FIG. 1, the harvester implement 20 includes a frame 22. An operator station 24 is attached to and supported by the frame 22. The operator station 24 houses control components of the harvester implement 20. The control components may include, but are not limited to a user interface 26 having an output and/or an input. The output is operable to convey a message to an operator. The input is operable to receive instructions from the operator. In the example implementation described herein, the input and the output are combined and implemented as a touch screen display. Messages may be communicated to the operator through the touch screen display, and data may be entered by the operator by touching the touch screen display as is understood by those skilled in the art. It should be appreciated that the input and the output may differ from the example implementation described herein and may be separate or combined components. For example, the output may include, but is not limited to, a video only display, an audio speaker, a light board, etc. The input may include, but is not limited to, a mouse, a keyboard, a microphone, a stick controller, one or more buttons, dials, etc.

Figure 2:
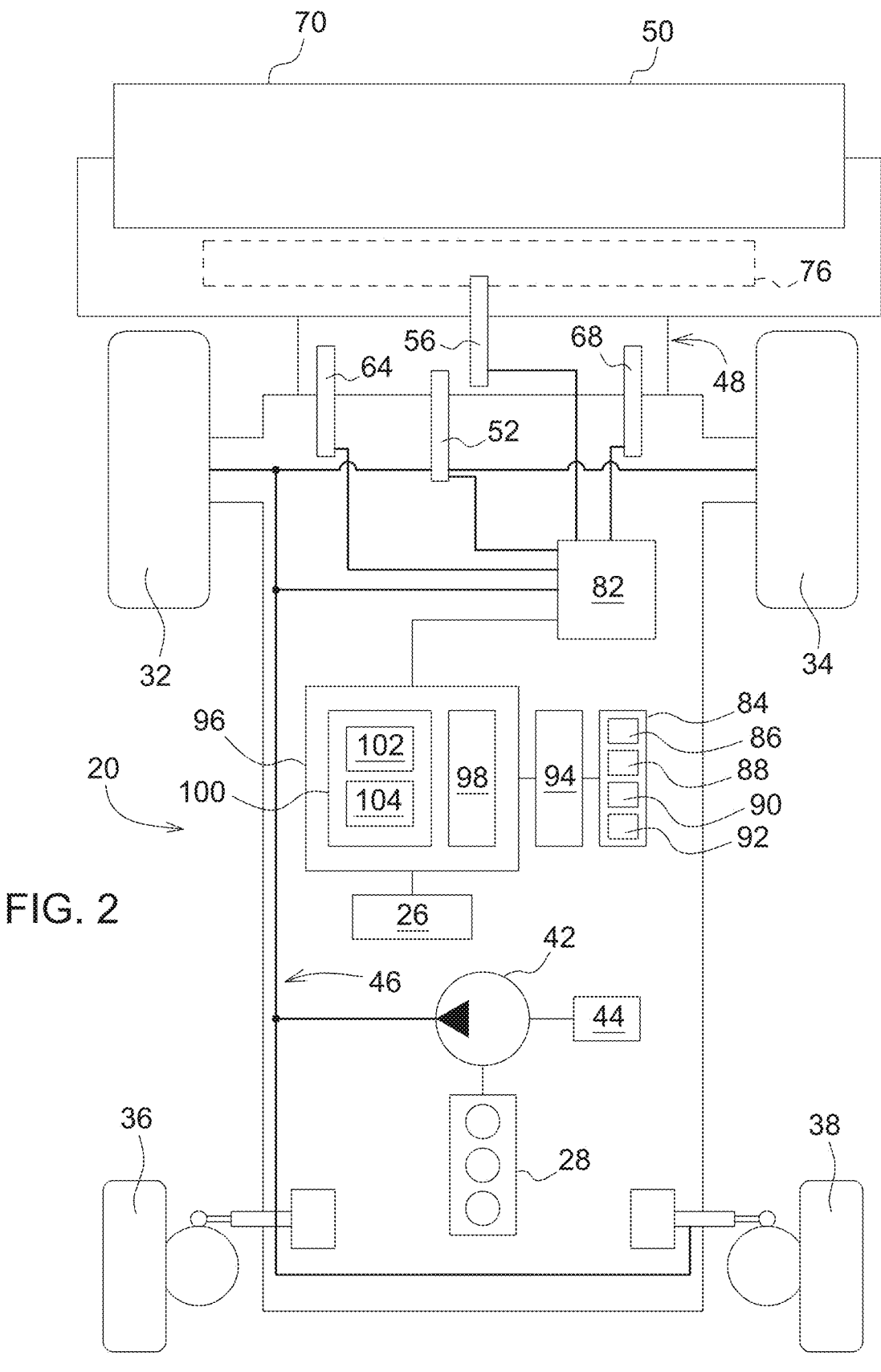
FIG. 2 is a schematic plan view of the harvester implement.

Referring to FIGS. 1 and 2, the frame 22 supports a power source 28. The power source 28 may alternatively be referred to as a prime mover. The power source 28 may include, but is not limited to, an internal combustion engine, an electric motor, a combination of both, or some other device capable of generating torque to power the harvester implement 20. The power source 28 includes a power control system 30 that is operable to control operation of the power source 28. For example, the power control system 30 may include, but is not limited to, a throttle for controlling a torque output of the power source 28. The power control system 30 may further include, but is not limited to, valves, actuators, linkages, control algorithms, etc., necessary to control the operation of the power source 28, including the throttle.

As best shown in FIG. 2, a left front drive wheel 32 and a right front drive wheel 34 are each mounted to the frame 22, adjacent a forward end of the frame 22. The left front drive wheel 32 and the right front drive wheel 34 are rotatable about a transverse axis. The transverse axis is generally perpendicular to a longitudinal axis of the frame 22. The left front drive wheel 32 and the right front drive wheel 34 may be simultaneously rotated in the same rotational direction and at the same rotational speed about the transverse axis to drive the harvester implement 20 forward or rearward, depending upon the direction of rotation. Additionally, the left front drive wheel 32 and the right front drive wheel 34 may be rotated in the same rotational direction at different rotational speeds about the transverse axis, or in opposite rotational directions at the same or different rotational speeds about the transverse axis, in order to turn the agricultural vehicle.

Referring to FIG. 2, the harvester implement 20 further includes a left rear caster wheel 36 and a right rear caster wheel 38 attached to the frame 22. As used herein, the term "caster wheel" should be understood to include a wheel that is able to rotate a full three hundred sixty degrees (360°) about a respective generally vertical axis. As such, each of the left rear caster wheel 36 and the right rear caster wheel 38 are rotatable a full three hundred sixty degrees (360°) about a respective generally vertical axis.

Figure 3:
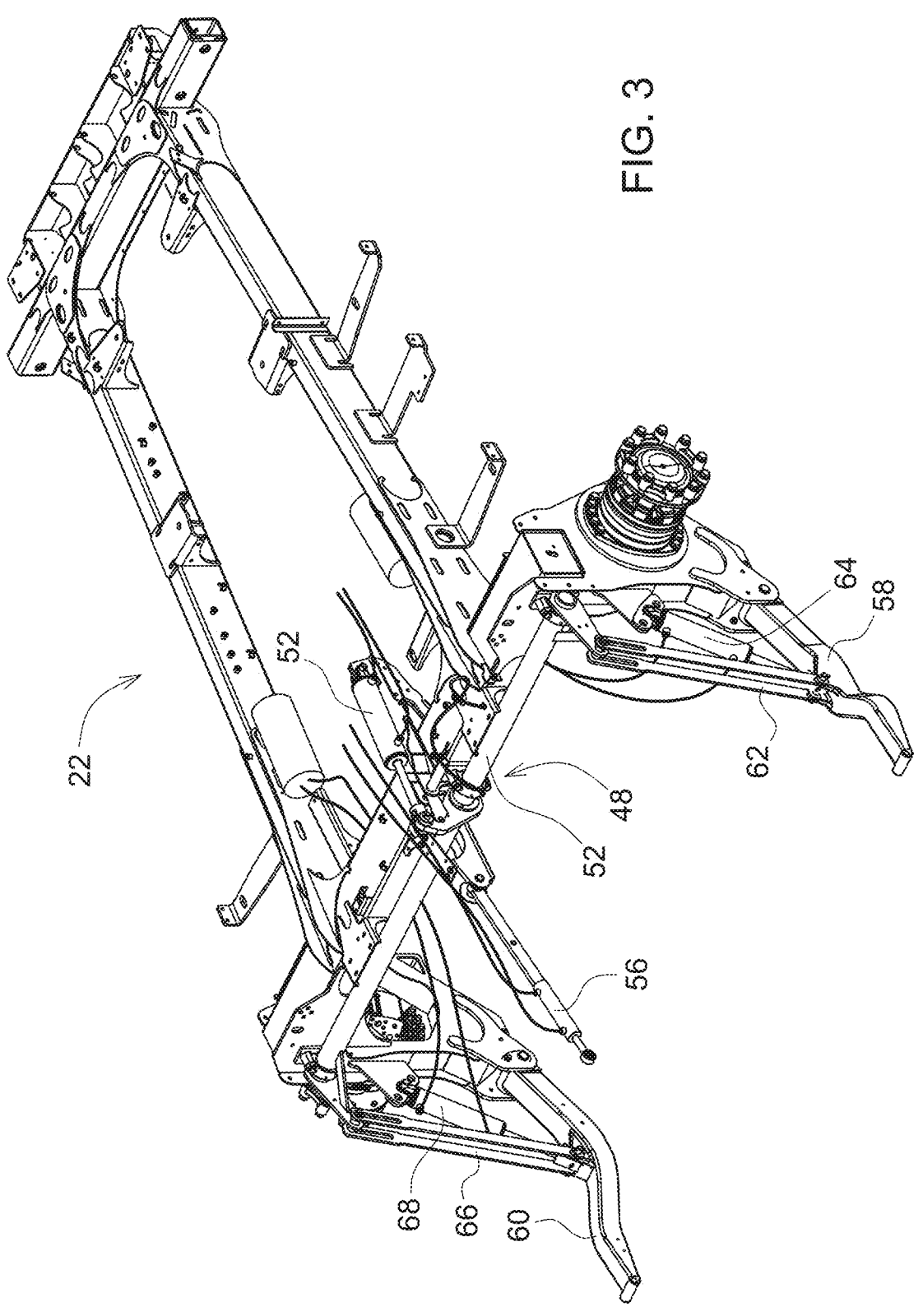
FIG. 3 is a schematic perspective view of a frame and header linkage system of the harvester implement.

Referring to FIGS. 2 and 3, the harvester implement 20 includes a hydraulic system 40. The hydraulic system 40 includes a pressure source 42 configured to supply a flow of pressurized fluid. The pressure source 42 may include, but is not limited to, a fluid pump that is drivenly coupled to the power source 28. The pressure source 42 draws fluid from a tank 44, and circulates the fluid through a fluid circuit 46. The tank 44 receives the fluid from the hydraulic system 40, stores the fluid, and supplies the fluid to the pressure source 42, e.g., the fluid pump. Fluid flow and/or pressure may be used to operate various components of the harvester implement 20, as described in greater detail below.

Referring to FIG. 3, the harvester implement 20 includes a header linkage system 48 attached to the frame 22. In the implementation shown in the Figures and described herein, the header linkage system 48 is attached to the frame 22 adjacent the forward end of the frame 22. The header linkage system 48 is configured for attaching a harvester header 50 to the frame 22. In the example implementation of the harvester implement 20 shown in the Figures and described herein, the harvester header 50 may include, but is not limited to, a rotary cutter such or a draper cutter as understood by those skilled in the art. However, it should be appreciated that other configurations of the harvester implement 20 may include other implementations of the harvester header 50, such as but not limited to a corn header, a grain header, etc.

The hydraulic system 40 is configured for operating the header linkage system 48 and the harvester header 50. Referring to FIG. 3, the header linkage system 48 includes a rockshaft 52 rotatably mounted to the frame 22 for rotational movement about a shaft axis that extends transverse to the longitudinal axis of the frame 22. A lift cylinder 54 is attached to and interconnects the rockshaft 52 and the frame 22. The lift cylinder 54 is operable to rotate the rockshaft 52 about the shaft axis in order to raise and lower the harvester header 50 relative to the ground surface. As such, the lift cylinder 54 is operated to control a vertical height or elevation position of the harvester header 50 above the ground surface. The lift cylinder 54 extends and retracts in response to fluid pressure and/or flow from the hydraulic system 40 in the usual manner as understood by those skilled in the art.

The header linkage system 48 may further include a tilt cylinder 56. The tilt cylinder 56 is attached to and interconnects the frame 22 and the harvester header 50 attached to the header linkage system 48. The tilt cylinder 56 is operable to rotate the harvester header 50 attached to the header linkage system 48 relative the ground surface. More specifically, the tilt cylinder 56 rotates the harvester header 50 about a tilt axis, which extends transverse to the longitudinal axis of the frame 22 and through distal ends of a left connecting arm 58 and a right connecting arm 60. As such, the tilt cylinder 56 is operable to control a tilt position of the harvester header 50. The tilt cylinder 56 extends and retracts in response to fluid pressure and/or flow from the hydraulic system 40 in the usual manner as understood by those skilled in the art.

The header linkage system 48 includes the left connecting arm 58 and the right connecting arm 60 noted above. The left connecting arm 58 is rotatably attached to the frame 22 below the rockshaft 52, on a left side of the frame 22. A left linkage 62 is attached to and interconnects the left connecting arm 58 and the rockshaft 52. A left float cylinder 64 is attached to and interconnects the frame 22 and the left linkage 62. A respective forward end of the left float cylinder 64 is attached to the left linkage 62. The left float cylinder 64 extends rearward and vertically upward to a respective rearward end of the left float cylinder 64, which is attached to the frame 22. The right connecting arm 60 is rotatably attached to the frame 22 below the rockshaft 52, on a right side of the frame 22. A right linkage 66 is attached to and interconnects the right connecting arm 60 and the rockshaft 52. A right float cylinder 68 is attached to and interconnects the frame 22 and the right linkage 66. A respective forward end of the right float cylinder 68 is attached to the right linkage 66. The right float cylinder 68 extends rearward and vertically upward to a respective rearward end of the right float cylinder 68, which is attached to the frame 22. The left float cylinder 64 and the right float cylinder 68 cooperate to provide a float pressure of the harvester header 50 for operating in a float condition as understood by those skilled in the art.

Figure 4:
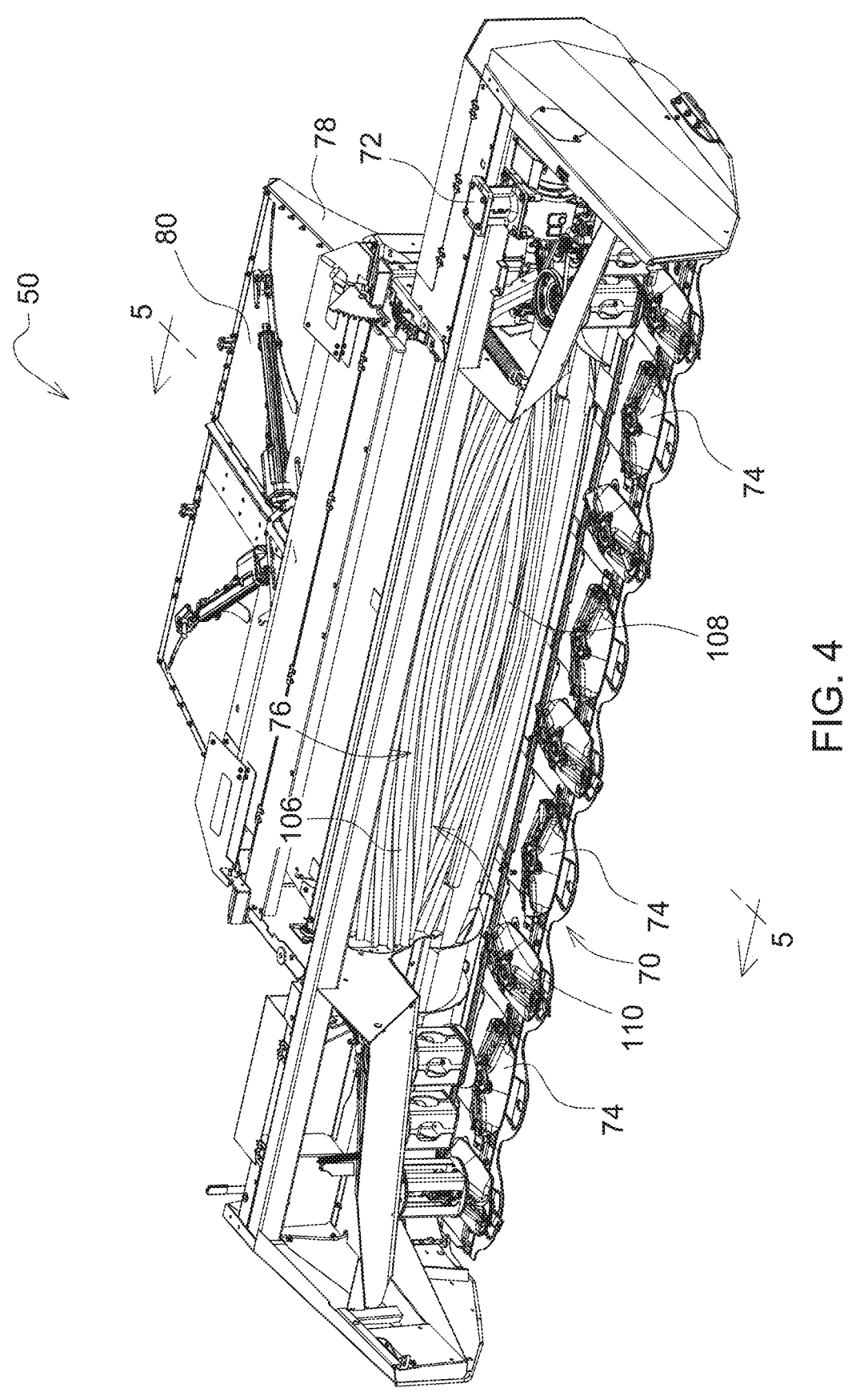
FIG. 4 is a schematic perspective view of a harvester header.
Figure 5:
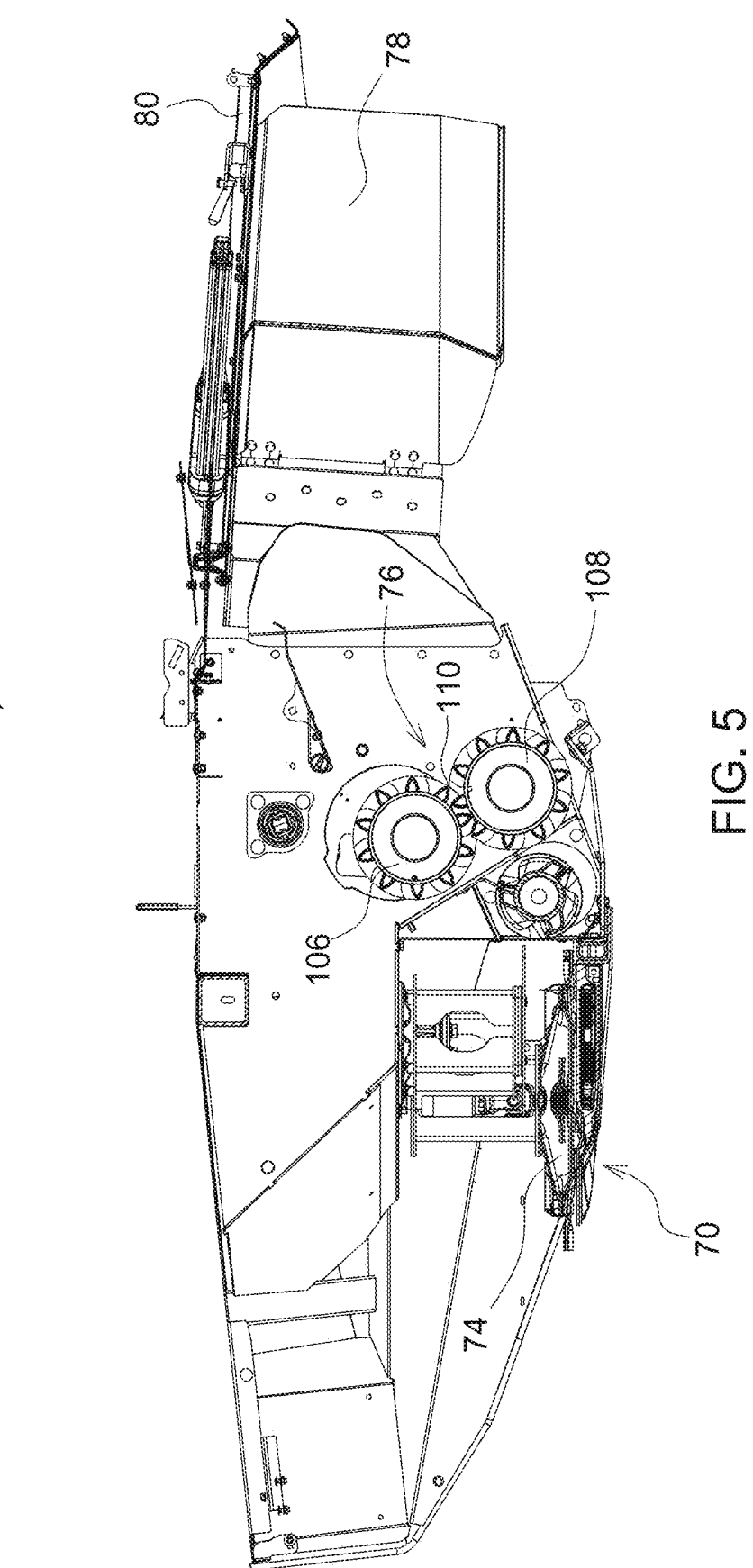
FIG. 5 is a schematic cross sectional view of the harvester header.

Referring to FIG. 4, the example implementation of the harvester header 50 described herein includes a cutting mechanism 70. The cutting mechanism 70 is coupled to the frame 22, and is operable to cut standing crop material in a field. The cutting mechanism 70 may include any mechanism that is capable of cutting the crop material. As shown in the Figures, the cutting mechanism 70 is embodied as a rotary disc cutter bar. The rotary disc cutter bar includes a plurality of cutter discs 74 that are rotatable about respective vertical axis as is understood by those skilled in the art. However, the cutting mechanism 70 is not limited to the exemplary embodiment of the rotary disc cutter bar. As such, it should be appreciated that the cutting mechanism 70 may vary from the exemplary embodiment shown in the Figures and described herein. The cutting mechanism 70 may include a header motor 72 for controlling a speed of a harvesting element of the harvester header 50. As an example, the harvesting element may include, but is not limited to, the rotating cutter discs 74 of the rotary disc cutter bar. The header motor 72 may include, but is not limited to, a hydraulic motor that receives fluid flow from the hydraulic system 40 to power and rotate the rotary cutter discs 74 of the cutter bar. The header motor 72 is controllable to control a rotation output speed, which in turn controls the cutting speed of the cutting mechanism 70, e.g., the rotary cutter discs 74 of the cutter bar.

The cutting mechanism 70 delivers the cut crop material rearward for further processing by a crop processing unit 76. The crop processing unit 76 further conditions the crop material. The crop processing unit 76 may include for example, but is not limited to, a counter-rotating twin roller conditioning system or an impeller and hood conditioning system as is understood by those skilled in the art. The conditioned crop material is expelled rearward by the crop processing unit 76, and is formed into a windrow or swath by upright right and left forming shields 78 and a swathboard 80. The forming shields 78 are adjustable to control a width of the windrow. The swathboard 80 is adjustable to control a height of the windrow.

Referring to FIG. 2, the harvester header 50 includes a header control system 82 that is operable to control operation of the components of the harvester header 50. For example, the header control system 82 may be configured to control at least one of the float cylinder for controlling the float pressure of the harvester header 50, the tilt cylinder 56 for controlling the tilt position of the harvester header 50, the lift cylinder 54 for controlling the elevation position of the harvester header 50, the crop processing unit 76 for controlling the amount or degree of processing of the crop material, the left and/or right forming shields 78 for controlling the width of the windrow formed by the harvester header 50, the swathboard 80 for controlling the height of the windrow formed by the harvester header 50, and/or the header motor 72 for controlling the speed of the harvesting element of the harvester header 50, such as for example, the rotary cutter discs 74 of the cutter bar. The header control system 82 may include hydraulic valves, electronic control actuators, control algorithms, etc., necessary to control the operation of the various components of the harvester header 50 noted above. The manner in which the various components of the harvester header 50 are controller are known to those skilled in the art, and are therefore not described in greater detail herein.

Referring to FIG. 2, the harvester implement 20 further includes a vehicle light arrangement 84. The vehicle light arrangement 84 includes at least one of a field light unit 86 for lighting operations in a field, a road light unit 88 for lighting operations on a roadway, a beacon light unit 90 for signaling operations, and a service light unit 92 for lighting a service area of the harvester implement 20 during vehicle service and maintenance operations. The type, features, brightness, color, and position of the field light unit 86, the road light unit 88, the beacon, and the service light unit 92 are known to those skilled in the art, and are therefore not described in greater detail herein. The vehicle light arrangement 84 further includes a light control system 94 that is operable to control operation of the vehicle light arrangement 84, particularly the field light unit 86, the road light unit 88, the beacon, and the service light unit 92. The light control system 94 may include switches, electrical connections, sensors, control algorithms, etc., necessary for controlling the field light unit 86, the road light unit 88, the beacon, and the service light unit 92.

As shown in FIG. 2, the harvester implement 20 further includes a vehicle controller 96. The vehicle controller 96 is disposed in communication with the user interface 26, the power control system 30, the header control system 82, and the light control system 94. While the vehicle controller 96 is generally described herein as a singular device, it should be appreciated that the vehicle controller 96 may include multiple devices linked together to share and/or communicate information therebetween. Furthermore, it should be appreciated that the vehicle controller 96 may be located on the harvester implement 20 or located remotely from the harvester implement 20.

The vehicle controller 96 may alternatively be referred to as a computing device, a computer, a controller, a control unit, a control module, a module, etc. The vehicle controller 96 includes a processor 98, a memory 100, and all software, hardware, algorithms, connections, sensors, etc., necessary to manage and control the operation of the power source 28, the harvester header 50, and the vehicle light arrangement 84. As such, a method may be embodied as a program or algorithm operable on the vehicle controller 96. It should be appreciated that the vehicle controller 96 may include any device capable of analyzing data from various sensors, comparing data, making decisions, and executing the required tasks.

As used herein, "vehicle controller 96" is intended to be used consistent with how the term is used by a person of skill in the art, and refers to a computing component with processing, memory, and communication capabilities, which is utilized to execute instructions (i.e., stored on the memory 100 or received via the communication capabilities) to control or communicate with one or more other components. In certain embodiments, the vehicle controller 96 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The vehicle controller 96 may be in communication with other components on the harvester implement 20, such as hydraulic components, electrical components, and operator inputs within the operator station 24. The vehicle controller 96 may be electrically connected to these other components by a wiring harness such that messages, commands, and electrical power may be transmitted between the vehicle controller 96 and the other components. Although the vehicle controller 96 is referenced in the singular, in alternative embodiments the configuration and functionality described herein can be split across multiple devices using techniques known to a person of ordinary skill in the art.

The vehicle controller 96 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 100 may include any non-transitory/tangible medium which participates in providing data or computer-readable instructions. The memory 100 may be non-volatile or volatile. Non-volatile media may include, for example, optical or magnetic disks and other persistent memory. Example volatile media may include dynamic random access memory (DRAM), which may constitute a main memory. Other examples of embodiments for memory 100 include a floppy, flexible disk, or hard disk, magnetic tape or other magnetic medium, a CD-ROM, DVD, and/or any other optical medium, as well as other possible memory devices such as flash memory.

The vehicle controller 96 includes the tangible, non-transitory memory 100 on which are recorded computer-executable instructions, including an initialization algorithm 102. The processor 98 of the vehicle controller 96 is configured for executing the initialization algorithm 102. The initialization algorithm 102 implements a method of preparing the harvester implement 20 for a desired operating mode.

The vehicle controller 96 is configured to receive a command input. The command input selects one of a plurality of different machine initialization modes. Each of the plurality of machine initialization modes has a pre-defined setting for at least one of the power source 28, the harvester header 50, and the vehicle light arrangement 84 for implementing one of a plurality of different operating modes associated with their respective machine initialization mode.

In one implementation, the vehicle controller 96 may receive the command input from an operator via the user interface 26. The operator may select one of the plurality of machine initialization modes to prepare the harvester implement 20 for the next operation by selecting a button assigned to that specific machine initialization mode from the user interface 26, such as a touchscreen display. As such, the user enters the command input by touching the button designated for the desired machine initialization mode. The user interface 26 may then communicate the command input identifying the selected machine initialization mode to the vehicle controller 96, which in turn receives the command input.

In another implementation, the vehicle controller 96 may receive the command input automatically from a location algorithm 104. The location algorithm 104 may be stored on the memory 100 of the vehicle controller 96 and executed by the processor 98 of the vehicle controller 96, or may reside at a remote location and communicate the command input to the harvester machine, such as through a cloud-based connection, internet connection, wireless connection, etc.

The location algorithm 104 is operable to determine a current location of the harvester implement 20, select a desired one of the plurality of operating modes based on the current location of the harvester implement 20, and then automatically generate and communicate the command input commanding the one of the plurality of machine initialization modes associated with the desired one of the plurality of operating modes. The location algorithm 104 may determine the current location of the harvester implement 20 in a suitable manner, such as but not limited to a Global Positioning System sensor. Additionally, the location algorithm 104 may track the location of the harvester implement 20 over time to determine a direction of travel and/or an intended location. For example, the location algorithm 104 may track movement of the harvester implement 20 over a roadway and then entering a field. The location algorithm 104 may determine that the harvester implement 20 is entering a field based on the immediately previous travel on the roadway and the current location with a field. Once the location algorithm 104 has determined the current location of the field, then the location algorithm 104 may select the desired one of the plurality of operating modes based on the current location of the harvester implement 20. For example, if the location algorithm 104 determined that the harvester implement 20 has just entered a field, then the location algorithm 104 may select an in-field operating mode. Upon determining which operating mode to select, the location algorithm 104 may then select the machine initialization mode associated with the selected operating mode, and then generate the command input signal to communicate the selected machine initialization mode to the vehicle controller 96.

Upon receiving the command input, the vehicle controller 96 may then automatically control at least one of the power control system 30, the header control system 82, and the light control system 94 to establish the pre-defined setting therefor in one of the power source 28, the harvester header 50, and the vehicle light arrangement 84 respectively. The pre-defined setting defined by the selected one of the plurality of machine initialization modes is configured to prepare the harvester implement 20 for the one of the plurality of operating mode associated with the selected one of the plurality of machine initialization modes.

In one implementation, the plurality of machine initialization modes may include a field ready initialization mode for preparing the harvester implement 20 for operations in a field, such as but not limited to, a harvesting operation. The field ready initialization mode may implement a pre-defined setting to engage the field light unit 86, control the float cylinder to provide a desired float pressure, control the tilt cylinder 56 to provide a desired tilt angle of the harvester header 50, control the crop processing unit 76 to exhibit a desired level of processing, e.g., a desired roll gap 110 between a first processor roll 106 and a second processor roll 108 of the crop processing unit 76, control the forming shields 78 to a desired position, control the swathboard 80 to a desired position, control the throttle to a desired position to achieve an optimum torque from the power source 28, control the header motor 72 to achieve and optimum speed for the harvesting element, unlock the header harvester, and control the lift cylinder 54 to lower the header harvester to a desired elevation. The vehicle controller 96 may implement the pre-defined setting for the field ready initialization mode by controlling the power control system 30 of the power source 28, the header control system 82 of the harvester header 50, and/or the light control system 94 of the vehicle light arrangement 84.

In one implementation, the plurality of machine initialization modes may include a road ready initialization mode for preparing the harvester implement 20 for operations on a roadway, such as but not limited to traveling on a roadway between fields. The road ready initialization mode may implement a pre-defined setting to disengage the field light unit 86, engage the road light unit 88, engage the beacon light unit 90, disengage the crop processing unit 76, disengage movement of the forming shield 78, disengage movement of the swathboard 80, disengage the header motor 72, control the lift cylinder 54 to raise the harvester header 50, and lock the harvester header 50 in the raised position. The vehicle controller 96 may implement the pre-defined setting for the road ready initialization mode by controlling the power control system 30 of the power source 28, the header control system 82 of the harvester header 50, and/or the light control system 94 of the vehicle light arrangement 84.

The plurality of machine initialization modes may include a headland turn initialization mode for preparing the harvester implement 20 for a headland turn during operations in the field. The headland turn initialization mode may implement a pre-defined setting to disengage the header motor 72, control the lift cylinder 54 to raise the harvester header 50, control the lift cylinder 54 to lower the header harvester to a desired elevation after completion of the headland turn, and re-engage the header motor 72. The vehicle controller 96 may implement the pre-defined setting for the headland turn initialization mode by controlling the power control system 30 of the power source 28, and/or the header control system 82 of the harvester header 50.

The plurality of machine initialization modes may include a vehicle service initialization mode for preparing the harvester implement 20 for maintenance. The vehicle service initialization mode may implement a pre-defined setting to engage a park lock device to prevent movement of the harvester implement 20, disengage the header motor 72, disengage the power source 28, disengage the crop processing unit 76, disengage movement of the forming shield 78, disengage movement of the swathboard 80, lock the elevation of the harvester header 50, and engage the service light unit 92. The vehicle controller 96 may implement the pre-defined setting for the vehicle service initialization mode by controlling the power control system 30 of the power source 28, the header control system 82 of the harvester header 50, and/or the light control system 94 of the vehicle light arrangement 84.

The plurality of machine initialization modes may include a header attachment initialization mode for preparing the harvester implement 20 for attachment to the harvester header 50. The header attachment initialization mode may implement a pre-defined setting to control the float cylinder to release float pressure, control the tilt cylinder 56 to release tilt pressure, and control the lift cylinder 54 to lower the header linkage system 48 to a desired elevation. The vehicle controller 96 may implement the pre-defined setting for the header attachment initialization mode by controlling the power control system 30 of the power source 28, the header control system 82 of the harvester header 50, and/or the light control system 94 of the vehicle light arrangement 84.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A harvester implement comprising:
   a harvester header having a header control system operable to control operation of the harvester header;
   a vehicle controller including a processor and a memory having an initialization algorithm stored thereon, wherein the processor is operable execute the initialization algorithm to:
   receive a command input, wherein the command input selects one of a plurality of machine initialization modes, with each of the plurality of machine initialization modes having a pre-defined setting for the harvester header for implementing one of a plurality of operating modes associated therewith;
   automatically control the header control system to establish the pre-defined setting in the harvester header, which is defined by the selected one of the plurality of machine initialization modes, to prepare the harvester implement for the one of the plurality of operating mode associated with the selected one of the plurality of machine initialization modes;
   wherein the harvester header includes at least one of a float cylinder for controlling a float pressure of the harvester header, a tilt cylinder for controlling a tilt position of the harvester header, a lift cylinder for controlling an elevation position of the harvester header, a crop processing unit for processing crop material, a forming shield for controlling a width of a windrow formed by the harvester header, a swathboard for controlling a height of the windrow formed by the harvester header and a header motor for controlling a speed of a harvesting element of the harvester header;
   wherein the plurality of machine initialization modes includes a header attachment initialization mode for preparing the harvester implement for attachment to the harvester header; and
   wherein the header attachment initialization mode implements a pre-defined setting to control the float cylinder to release float pressure, control the tilt cylinder to release tilt pressure, control the lift cylinder to lower a header mount.

2. The harvester implement set forth in claim 1, further comprising:
   a power source having a power control system operable to control operation of the power source;
   a vehicle light arrangement having a light control system operable to control operation of the vehicle light arrangement;
   wherein the processor is operable execute the initialization algorithm to:
   receive the command input, wherein the command input selects one of the plurality of machine initialization modes, with each of the plurality of machine initialization modes having a pre-defined setting for at least one of the power source, and the vehicle light arrangement for implementing one of a plurality of operating modes associated therewith; and
   automatically control at least one of the power control system, and the light control system to establish the pre-defined setting therefor in one of the power source, and the vehicle light arrangement respectively, which is defined by the selected one of the plurality of machine initialization modes, to prepare the harvester implement for the one of the plurality of operating mode associated with the selected one of the plurality of machine initialization modes.

3. The harvester implement set forth in claim 2, further comprising a user interface in communication with the vehicle controller, wherein the processor is operable execute the initialization algorithm to receive the command input from an operator via the user interface.

4. The harvester implement set forth in claim 2, wherein the processor is operable execute the initialization algorithm to receive the command input from a location algorithm.

5. The harvester implement set forth in claim 4, wherein the location algorithm is stored on the memory of the vehicle controller, and wherein the processor is operable to execute the location algorithm to:
   determine a current location of the harvester implement;
   select a desired one of the plurality of operating modes based on the current location of the harvester implement; and generate the command input commanding the one of the plurality of machine initialization modes associated with the desired one of the plurality of operating modes.

6. The harvester implement set forth in claim 2, wherein the vehicle light arrangement includes at least one of a field light unit for lighting operations in a field, a road light unit for lighting operations on a roadway, a beacon light unit for signaling operations, and a service light unit for vehicle service and maintenance operations.

7. The harvester implement set forth in claim 2, wherein the power source includes a throttle for controlling a torque output of the power source.

8. The harvester implement set forth in claim 7, wherein the plurality of machine initialization modes includes a field ready initialization mode for preparing the harvester implement for operations in a field.

9. The harvester implement set forth in claim 8, wherein the field ready initialization mode implements a pre-defined setting to engage the field light unit, control the float cylinder to provide a desired float pressure, control the tilt cylinder to provide a desired tilt angle of the harvester header, control the crop processing unit to exhibit a desired roll gap between a first processor roll and a second processor roll, control the forming shield to a desired position, control the swathboard to a desired position, control the throttle to a desired position to achieve an optimum torque from the power source, control the header motor to achieve and optimum speed for the harvesting element, unlock the header harvester, and control the lift cylinder to lower the header harvester to a desired elevation.

10. The harvester implement set forth in claim 7, wherein the plurality of machine initialization modes includes a road ready initialization mode for preparing the harvester implement for operations on a roadway.

11. The harvester implement set forth in claim 10, wherein the road ready initialization mode implements a pre-defined setting to disengage the field light unit, engage the road light unit, engage the beacon light unit, disengage the crop processing unit, disengage movement of the forming shield, disengage movement of the swathboard, disengage the header motor, control the lift cylinder to raise the harvester header, and lock the harvester header in the raised position.

12. The harvester implement set forth in claim 7, wherein the plurality of machine initialization modes includes a headland turn initialization mode for preparing the harvester implement for a headland turn during operations in the field.

13. The harvester implement set forth in claim 12, wherein the headland turn initialization mode implements a pre-defined setting to disengage the header motor, control the lift cylinder to raise the harvester header, control the lift cylinder to lower the header harvester to a desired elevation after completion of the headland turn, and re-engage the header motor.

14. The harvester implement set forth in claim 1, wherein the harvester implement is a self-propelled windrower.

15. A harvester implement comprising:

a power source having a power control system operable to control operation of the power source;

wherein the power source includes a throttle for controlling a torque output of the power source;

a harvester header having a header control system operable to control operation of the harvester header;

wherein the harvester header includes at least one of a float cylinder for controlling a float pressure of the harvester header, a tilt cylinder for controlling a tilt position of the harvester header, a lift cylinder for controlling an elevation position of the harvester header, a crop processing unit for processing crop material, a forming shield for controlling a width of a windrow formed by the harvester header, a swathboard for controlling a height of the windrow formed by the harvester header, and a header motor for controlling a speed of a harvesting element of the harvester header;

a vehicle light arrangement having a light control system operable to control operation of the vehicle light arrangement;

wherein the vehicle light arrangement includes at least one of a field light unit for lighting operations in a field, a road light unit for lighting operations on a roadway, a beacon light unit for signaling operations, and a service light unit for vehicle service and maintenance operations;

a vehicle controller including a processor and a memory having an initialization algorithm stored thereon, wherein the processor is operable execute the initialization algorithm to:

receive a command input, wherein the command input selects one of a plurality of machine initialization modes, with each of the plurality of machine initialization modes having a pre-defined setting for at least one of the power source, the harvester header, and the vehicle light arrangement for implementing one of a plurality of operating modes associated therewith;

wherein the plurality of machine initialization modes includes a vehicle service initialization mode for preparing the harvester implement for maintenance;

automatically control at least one of the power control system, the header control system, and the light control system to establish the pre-defined setting therefor in one of the power source, the harvester header, and the vehicle light arrangement respectively, which is defined by the selected one of the plurality of machine initialization modes, to prepare the harvester implement for the one of the plurality of operating mode associated with the selected one of the plurality of machine initialization modes; and wherein the vehicle service initialization mode implements a pre-defined setting to engage a park lock device, disengage the header motor, disengage the power source, disengage the crop processing unit, disengage movement of the forming shield, disengage movement of the swathboard, lock the elevation of the harvester header, and engage the service light unit.

* * * * *